United States Patent
Jackson, Jr. et al.

(10) Patent No.: US 9,387,865 B2
(45) Date of Patent: Jul. 12, 2016

(54) END MEMBER ASSEMBLIES AS WELL AS GAS SPRING ASSEMBLIES AND METHODS OF MANUFACTURE INCLUDING SAME

(71) Applicant: Firestone Industrial Products Company, LLC, Indianapolis, IN (US)

(72) Inventors: David D. Jackson, Jr., Noblesville, IN (US); Jakob B. Cagle, Indianapolis, IN (US); Charlie B. Groover, Pendleton, IN (US)

(73) Assignee: Firestone Industrial Products Company, LLC, Indianapolis, IN (US)

( * ) Notice: Subject to any disclaimer, the term of this patent is extended or adjusted under 35 U.S.C. 154(b) by 0 days.

(21) Appl. No.: 14/182,733

(22) Filed: Feb. 18, 2014

(65) Prior Publication Data

US 2014/0230687 A1 Aug. 21, 2014

Related U.S. Application Data

(60) Provisional application No. 61/765,873, filed on Feb. 18, 2013.

(51) Int. Cl.
*B61F 5/00* (2006.01)
*B61F 5/10* (2006.01)
*F16F 1/38* (2006.01)
(Continued)

(52) U.S. Cl.
CPC . *B61F 5/10* (2013.01); *B60G 11/27* (2013.01); *B60G 11/62* (2013.01); *B61F 5/144* (2013.01); *F16F 1/3835* (2013.01); *F16F 1/406* (2013.01);
(Continued)

(58) Field of Classification Search
CPC ........... F16F 9/057; F16F 9/05; F16F 13/002; F16F 13/26; F16F 13/264; F16F 13/106; F16F 13/268; B61F 5/08; B61F 5/10
See application file for complete search history.

(56) References Cited

U.S. PATENT DOCUMENTS 3,081,075 A * 3/1963 Selman ....................... 267/64.24
3,826,507 A * 7/1974 Brand et al. ..................... 267/3

(Continued)

FOREIGN PATENT DOCUMENTS

| CN | 101929518 | 12/2010 |
| DE | 3237834 | 4/1983 |

(Continued)

OTHER PUBLICATIONS

International Search Report and Written Opinion for corresponding PCT Application No. PCT/US2014/016838 dated Dec. 4, 2014.

*Primary Examiner* — Jason C Smith
(74) *Attorney, Agent, or Firm* — Thomas R. Kingsbury; Fay Sharpe LLP

(57) ABSTRACT

An end member assembly dimensioned for securement to an associated flexible spring member of an associated gas spring assembly. The end member assembly can include a base wall and a mounting wall disposed in axially-spaced relation to the base wall. A compliant support structure is disposed between the base and mounting walls. The compliant support structure includes at least one compliant element that includes a compliant element body and one or more reinforcing plies at least partially embedded within the compliant element body. Rigid elements can be disposed between adjacent compliant elements if two or more compliant elements are included. A gas spring assembly and a method of manufacture can include one or more of such end member assemblies.

22 Claims, 7 Drawing Sheets

(51) Int. Cl.
  *F16F 1/40* (2006.01)
  *F16F 9/04* (2006.01)
  *B60G 11/27* (2006.01)
  *B60G 11/62* (2006.01)
  *B61F 5/14* (2006.01)

(52) U.S. Cl.
  CPC ............. *F16F 9/04* (2013.01); *B60G 2206/424* (2013.01); *Y10T 29/49609* (2015.01)

(56) References Cited

U.S. PATENT DOCUMENTS

| | | | |
|---|---|---|---|
| 3,904,181 A * | 9/1975 | Harsy-Vadas | 267/35 |
| 5,005,808 A * | 4/1991 | Warmuth et al. | 267/64.27 |
| 6,257,561 B1 * | 7/2001 | Nakayama et al. | 267/64.19 |
| 6,361,028 B1 * | 3/2002 | Hubbell | 267/64.27 |
| 8,220,785 B2 * | 7/2012 | Bank et al. | 267/64.27 |
| 2011/0031662 A1 * | 2/2011 | Toyama | 267/121 |
| 2011/0233832 A1 * | 9/2011 | Sawa et al. | 267/3 |
| 2013/0313764 A1 * | 11/2013 | Fujimoto et al. | 267/64.27 |
| 2014/0117597 A1 * | 5/2014 | Fujimoto | 267/35 |
| 2014/0175717 A1 * | 6/2014 | Jackson, Jr. | 267/64.27 |
| 2014/0300038 A1 * | 10/2014 | Kita et al. | 267/122 |

FOREIGN PATENT DOCUMENTS

| | | |
|---|---|---|
| EP | 0254084 | 1/1988 |
| EP | 2251562 | 11/2010 |
| JP | 2008196629 | 8/2008 |
| JP | 2010221915 | 10/2010 |
| WO | WO 2012/105444 | 8/2012 |

* cited by examiner

END MEMBER ASSEMBLIES AS WELL AS GAS SPRING ASSEMBLIES AND METHODS OF MANUFACTURE INCLUDING SAME

This application claims the benefit of U.S. Provisional Application No. 61/765,873, filed on Feb. 18, 2013, the entire contents of which is hereby incorporated herein by reference.

BACKGROUND

The subject matter of the present disclosure broadly relates to spring devices and, more particularly, to end member assemblies for rolling lobe-style gas spring assemblies that include one or more reinforced, elastomeric elements. Gas spring assemblies and methods of manufacture including such end members are also included.

The subject matter of the present disclosure is capable of broad application and use in connection with a variety of applications and/or environments. In some cases, the subject matter may find particular application and use in conjunction with rail vehicles, and will be described herein with particular reference thereto. It is to be appreciated, however, that the subject matter of the present disclosure is amenable to use in connection with other applications and environments.

A suspension system, such as may be used in connection with motorized vehicles and/or rolling-stock rail vehicles, for example, can include one or more spring elements for accommodating forces and loads associated with the operation and use of the corresponding device (e.g., a motorized vehicle) to which the suspension system is operatively connected. In such applications, it is often considered desirable to utilize spring elements that operate at a lower spring rate, as a reduced spring rate can favorably influence certain performance characteristics, such as vehicle ride quality and comfort, for example. That is, it is well understood in the art that the use of a spring element having a higher spring rate (i.e. a stiffer spring) will transmit a greater magnitude of inputs (e.g., road inputs) to the sprung mass and that, in some applications, this could undesirably affect the sprung mass, such as, for example, by resulting in a rougher, less-comfortable ride of a vehicle. Whereas, the use of spring elements having lower spring rates (i.e., a softer or more-compliant spring) will transmit a lesser amount of the inputs to the sprung mass.

Notwithstanding the common usage and overall success of conventional gas spring devices that include an end member with a compliant support structure, it is believed beneficial to continue to develop end members that may advance the art of gas spring devices, such as by developing constructions that can provide desired performance characteristics and/or other features.

BRIEF SUMMARY

One example of an end member assembly in accordance with the subject matter of the present disclosure can be dimensioned for securement to an end of an associated flexible spring member of an associated gas spring assembly. The end member assembly can include a base plate including a base plate wall formed from a substantially rigid material and dimensioned for securement to an associated structural component. A mounting plate can be disposed in spaced relation to the base plate such that an end member axis extends longitudinally therebetween. The mounting plate can include a mounting plate wall formed from a substantially rigid material and dimensioned for securement to an end of the associated spring member. A compliant support structure can be secured between the base plate and the mounting plate. The compliant support structure can include a compliant element having a body at least partially formed from a compliant material and at least one reinforcing ply at least partially embedded within the body.

One example of a gas spring assembly in accordance with the subject matter of the present disclosure can include a flexible spring member having a longitudinal axis and extending between a first end and a second end opposite the first end. The flexible spring member can extend peripherally about the longitudinal axis such that a spring chamber is at least partially defined by the flexible spring member between the first and second ends. An end member can extend across the first end of the flexible spring member and can be secured to the flexible spring member such that a substantially fluid-tight seal is formed therewith. An end member assembly can include a base plate, a mounting plate and a compliant support structure. The base plate can include a base plate wall formed from a substantially rigid material and dimensioned for securement to an associated structural component. The mounting plate can include a mounting plate wall formed from a substantially rigid material and dimensioned for securement to an end of the associated flexible spring member. The compliant support structure can be secured between the base plate and the mounting plate. The compliant support structure can include a compliant element having a body at least partially formed from a compliant material and at least one reinforcing ply at least partially embedded within the body. The at least one reinforcing ply can be operative to restrict radially-outward expansion of the at least one compliant element under compression of the gas spring assembly.

One example of a suspension system in accordance with the subject matter of the present disclosure can include a pressurized gas system that can include a pressurized gas source and a control device. The suspension system can also include at least one gas spring assembly according to the foregoing paragraph that is disposed in fluid communication with the pressurized gas source through the control device such that pressurized gas can be selectively transferred into and out of the spring chamber of the at least one gas spring assembly.

One example of a method of manufacturing a gas spring assembly in accordance with the subject matter of the present disclosure can include providing a flexible spring member having a longitudinal axis. The flexible spring member can extend between a first end and a second end opposite the first end. The flexible spring member can extend peripherally about the longitudinal axis such that a spring chamber can be at least partially defined by the flexible spring member between the first and second ends. The method can also include providing an end member and securing the end member across the first end of the flexible spring member such that a substantially fluid-tight seal is formed between the end member and the flexible spring member. The method can further include providing an end member assembly including a base plate, a mounting plate and a compliant support structure. The base plate can include a base plate wall formed from a substantially rigid material and dimensioned for securement to an associated structural component. The mounting plate can include a mounting plate wall formed from a substantially rigid material and disposed in axially-spaced relation to the base plate with the compliant support structure secured between the base plate and the mounting plate. The compliant support structure can include a compliant element having a body at least partially formed from a compliant material and at least one reinforcing ply at least partially embedded within the body. The at least one reinforcing ply can be operative to restrict radially-outward expansion of the at least one compliant element under compression of the gas spring assembly. The method can also include securing the end member assembly across the second end of the flexible spring member such that a substantially fluid-tight seal is formed between the end member assembly and the flexible spring member.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purpose of clarity and ease of understanding.

Figure 1:
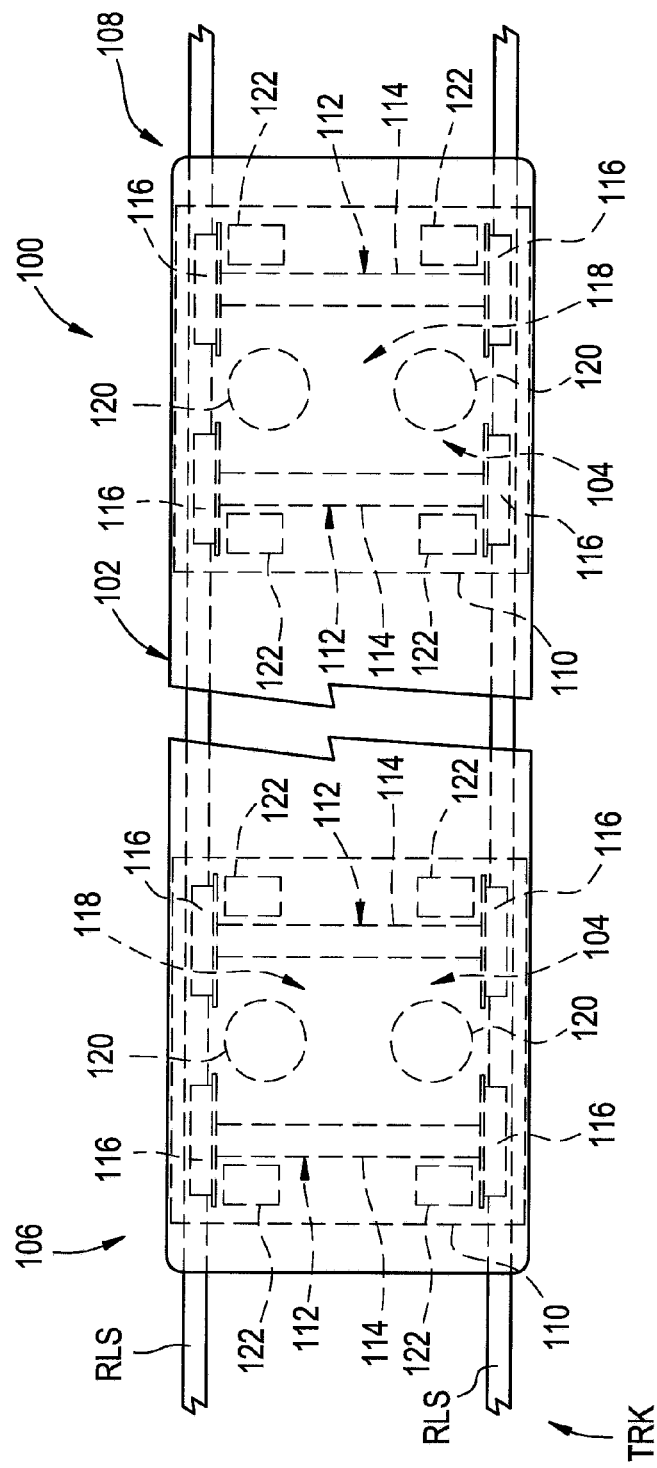
FIG. 1 is a schematic representation of one example of a rail vehicle including a suspension system in accordance with the subject matter of the present disclosure.
Figure 2:
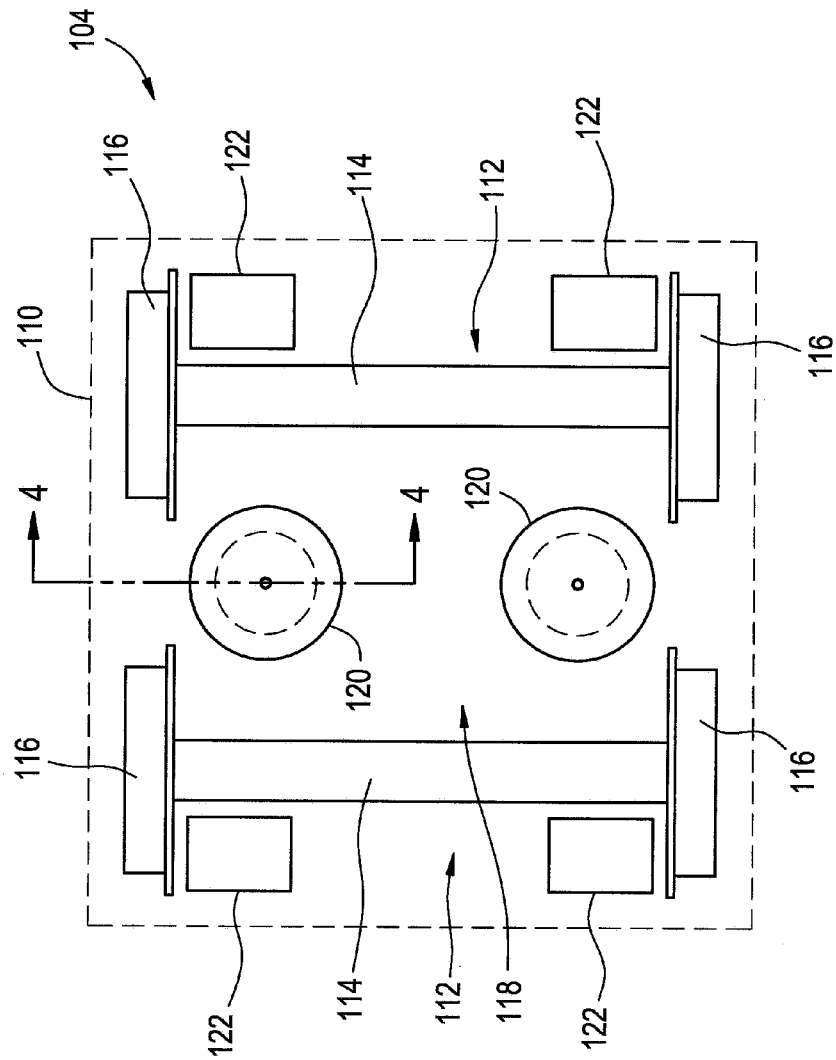
FIG. 2 is an enlarged schematic representation of one of the frame and wheel assemblies of the rail vehicle shown in FIG. 1.

FIGS. 1 and 2 illustrate one example of a vehicle including a suspension system in accordance with the subject matter of the present disclosure, such as a vehicle 100 that is adapted for movement or is otherwise displaceable along a track TRK that is at least partially formed by rails RLS of an indefinite length. It will be appreciated that the subject matter of the present disclosure is broadly applicable for use in a wide variety of applications, and that rail vehicle 100 merely represents one example of a suitable application. Rail vehicle 100 is shown being representative of rolling stock (e.g., a railcar) rather than an engine or traction drive vehicle. However, this representative use is merely exemplary and not intended to be limiting.

Rail vehicle 100 includes a vehicle body 102 supported on one or more frame and wheel assemblies 104, two of which are shown in FIG. 1. In some cases, frame and wheel assemblies 104 may be referred to in the art as "trucks," "rail bogies" or simply "bogies," and such terms may be used herein in an interchangeable manner. Bogies 104 are shown as being disposed toward opposing ends 106 and 108 of rail vehicle 100.

Bogies 104 are shown in FIGS. 1 and 2 as including a frame 110 as well as one or more wheel sets 112 that are typically formed by an axle 114 and a pair of spaced-apart wheels 116. Normally, bogies 104 include at least two wheel sets, such as are shown in FIGS. 1 and 2, for example, that are operatively connected to the frame in manner suitable to permit the wheels to roll along rails RLS of track TRK. In many cases, a primary suspension arrangement (not shown) is operatively connected between the wheels sets and the frame to permit relative movement therebetween. Bogies 104 are also shown as including a secondary suspension system 118 that includes at least one gas spring assembly. In the exemplary arrangement shown in FIGS. 1-3, bogies 104 include two gas spring assemblies 120 that are operatively connected between frame 110 and vehicle body 102 to permit relative movement therebetween.

Rail vehicles, such as rail vehicle 100, for example, typically include a braking system with one or more brakes operatively associated with each wheel set. In the exemplary arrangement in FIGS. 1 and 2, two brakes 122 are shown as being operatively associated with each of wheel sets 112 with one brake disposed adjacent each of wheels 116. It will be appreciated, however, that other arrangements could alternately be used.

Additionally, rail vehicles, such as rail vehicle 100, for example, typically include at least one pneumatic system that is operatively associated therewith. In many cases, components of the one or more pneumatic systems can be distributed along the length of a train that is formed from a plurality of rail vehicles, such as one or more traction-drive engines and one or more rolling stock vehicles, for example. In such cases, each individual rail vehicle will include one or more portions of the pneumatic system. Usually, these one or more portions are serially connected together to form an overall pneumatic system of a train.

Typical pneumatic systems include two or more separately controllable portions, such as a pneumatic braking system that is operatively associated with the vehicle brakes (e.g., brakes 122) and a pneumatic supply system that is operatively associated with the other pneumatically-actuated devices of the rail vehicle, such as the secondary suspension system, for example. As such, rail vehicles typically include a dedicated conduit for each of these two systems. Such conduits normally extend lengthwise along the vehicle body and are often individually referred to as a brake pipe and a supply pipe.

Figure 3:
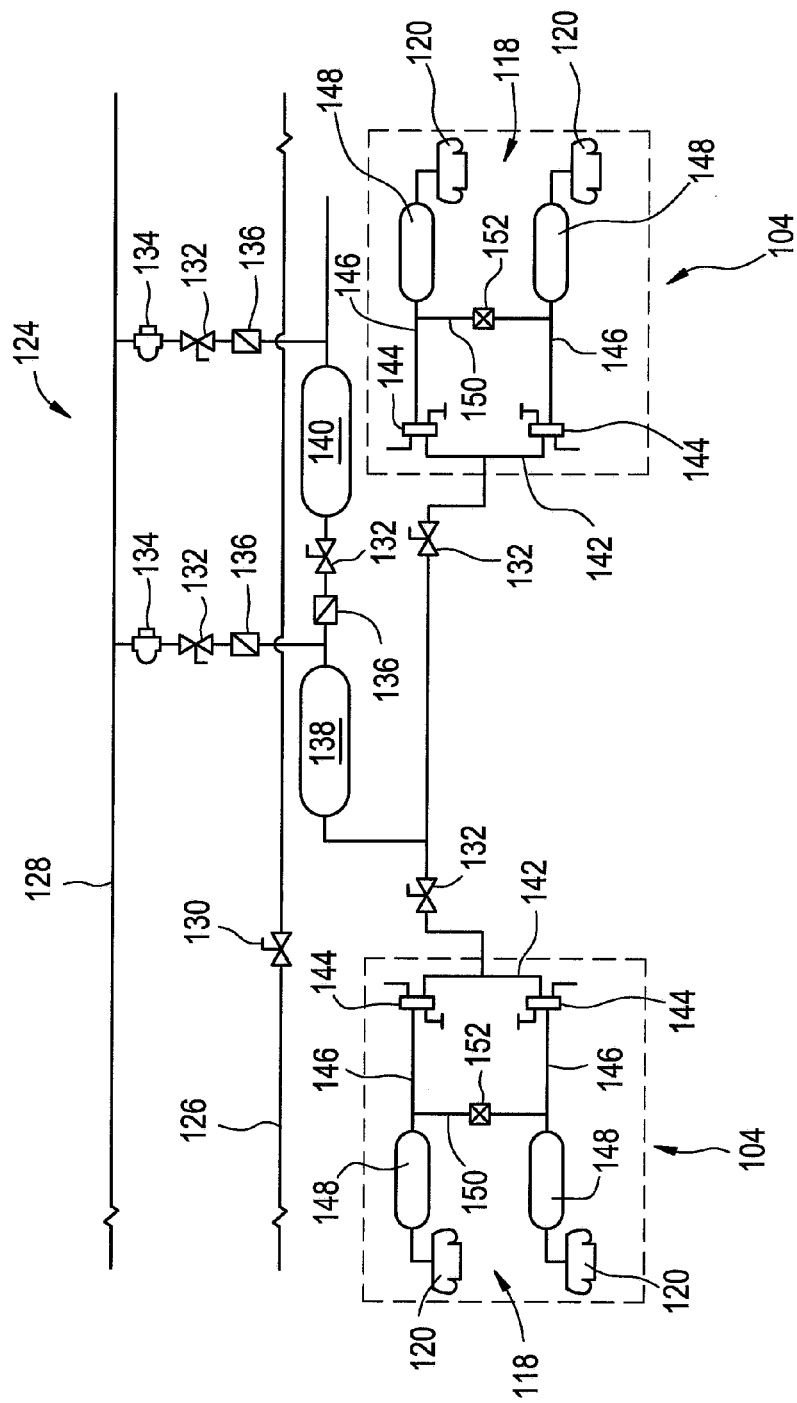
FIG. 3 is a schematic representation of one example of a pneumatic gas system operatively associated with the suspension system of the rail vehicle shown in FIG. 1.

FIG. 3 illustrates one example of a pneumatic system 124 that is operatively associated with rail vehicle 100 and includes a braking system (not numbered) with a brake pipe 126 in fluid communication with at least brakes 122 (FIGS. 1 and 2) and a pneumatic supply system (not numbered) with a supply pipe 128 in fluid communication with at least gas spring assemblies 120 of secondary suspension system 118. It will be recognized and appreciated that pneumatic system 124 will include a wide variety of other components and devices. For example, the braking system can include one or more isolation valves 130 that can be fluidically connected along brake pipe 126. As other examples, the pneumatic supply system can include one or more isolation valves 132, one or more filters 134 and/or one or more non-return valves 136 (which may be alternately referred to as one-way or check valves). The pneumatic supply system can also include one or more reservoirs or other pressurized gas storage devices. In the arrangement shown in FIG. 3, for example, the pneumatic supply system includes a reservoir 138 that is operative to store a quantity of pressurized gas for use in supplying gas spring assemblies 120 of the secondary suspension system, and a reservoir 140 that is operative to store a quantity of pressurized gas for use as the auxiliary reservoir of the braking system.

Generally, certain components of the braking system, such as brakes 122, for example, as well as certain components of the pneumatic supply system are supported on or otherwise operatively associated with one of bogies 104 of rail vehicle 100. For example, supply lines 142 can fluidically interconnect bogies 104 with the pneumatic supply system. Supply lines 142 are shown as being fluidically connected with one or more leveling valves 144 that are operatively connected with gas spring assemblies 120, such as by way of gas lines 146, and are selectively operable to transfer pressurized gas into and out of the gas spring assemblies. In some cases, a pressurized gas storage device or reservoir 148 can, optionally, be fluidically connected along gas line 146 between leveling valve 144 and gas spring assembly 120. Additionally, a cross-flow line 150 can, optionally, be connected in fluid communication between two or more of gas lines 146. In some cases, a control valve 152, such as a duplex check valve, for example, can be fluidically connected along cross-flow line 150, such as is shown in FIG. 3, for example.

Figure 4:
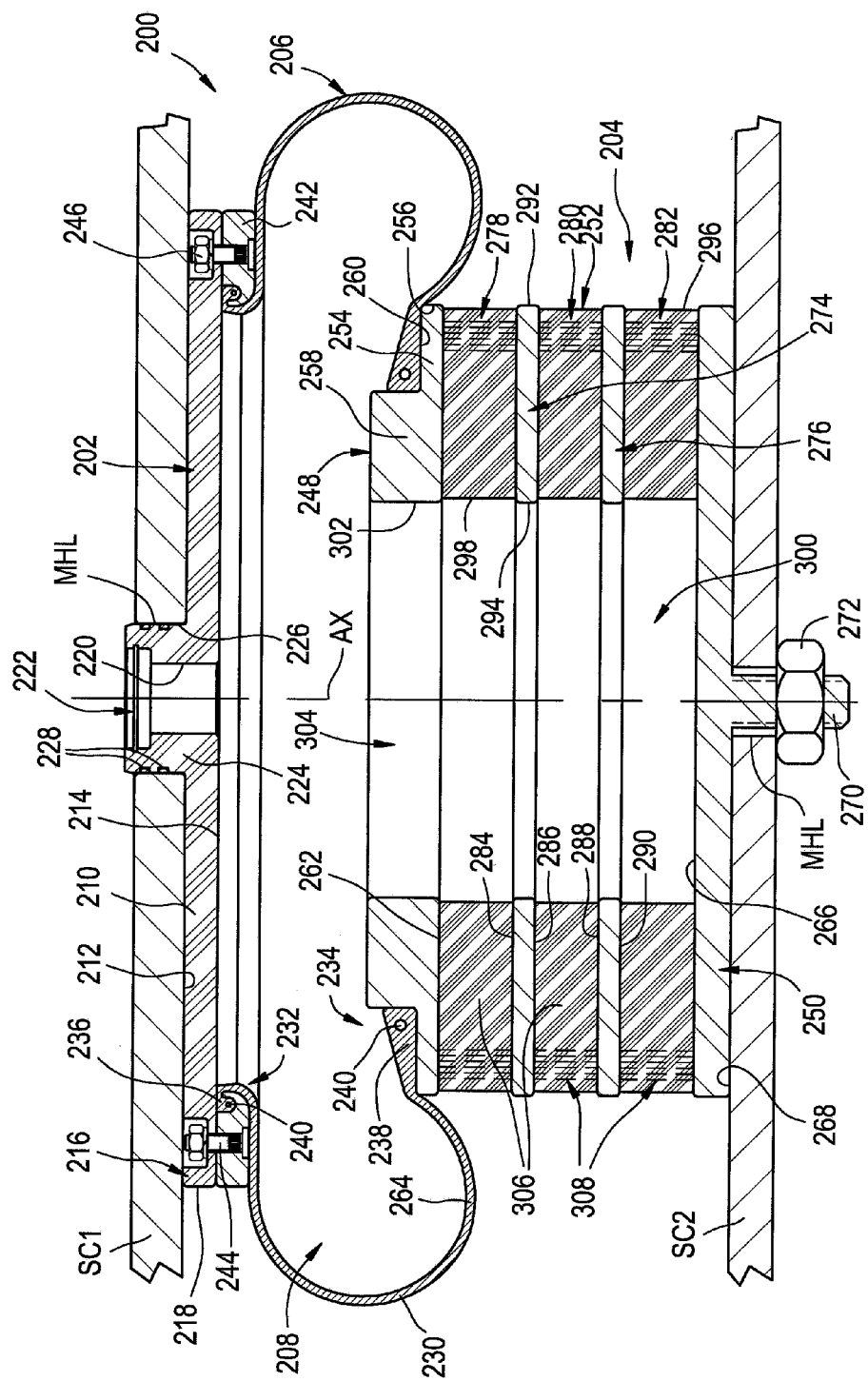
FIG. 4 is a cross-sectional side view of a gas spring assembly including one example of an end member in accordance with the subject matter of the present disclosure with the cross section taken from along line 4-4 in FIG. 2.

One example of a gas spring assembly in accordance with the subject matter of the present disclosure, such as may be suitable for use as one or more of gas spring assemblies 120 in FIGS. 1-3, for example, is shown as gas spring assembly 200 in FIG. 4. The gas spring assembly has a longitudinal axis AX and includes an end member 202, an end member 204 spaced longitudinally from end member 202 and a flexible spring member or sleeve 206 that extends peripherally about the longitudinal axis and is secured between the end members to at least partially define a spring chamber 208.

Gas spring assembly 200 can be disposed between associated sprung and unsprung masses of an associated vehicle in any suitable manner. For example, one end member can be operatively connected to an associated sprung mass with the other end member disposed toward and operatively connected to the associated unsprung mass. In the embodiment shown in FIG. 4, for example, end member 202 is secured on or along a structural component SC1, such as an associated vehicle body 102 in FIG. 1, for example, and can be secured thereon in any suitable manner. As another example, end member 204 is secured on or along a structural component SC2, such as an associated rail bogie 104 in FIGS. 1 and 2, for example, and can be secured thereon in any suitable manner.

In the exemplary arrangement in FIG. 4, end member 202 is shown as taking the form of a top plate having a plate wall 210 that has opposing surfaces 212 and 214 such that a plate height (not identified) is at least partially defined therebetween. Plate wall 210 is shown as being generally planar and extending outwardly to an outer periphery 216. In some cases, plate wall 210 can have a generally circular shape. As such, in some cases, an outer peripheral surface 218 extending in a heightwise direction can have a generally cylindrical shape. A passage surface 220 at least partially defines a gas transfer passage 222 extending through the end member such that pressurized gas can be transferred into and out of spring chamber 208, such as by way of pneumatic system 124 (FIG. 3) for example. In some cases, the end member can include a projection or boss 224 that extends from along plate wall 210 in a longitudinal direction. In the exemplary arrangement shown in FIG. 4, projection 224 extends axially outwardly away from spring chamber 208.

As mentioned above, one or more securement devices (not shown) can be used to secure or otherwise interconnect the end members of the gas spring assembly with corresponding structural components. In some cases, projection 224 can include an outer surface 226 that is dimensioned for receipt within a passage or mounting hole MHL that extends through structural component SC1. Additionally, one or more sealing elements 228 can, optionally, be included that are disposed between or otherwise at least partially form a substantially fluid-tight connection between the end member and the structural component, such as between projection 224 and mounting hole MHL, for example. In some cases, structural component SC1 can, optionally, at least partially define an external reservoir suitable for storing a quantity of pressurized gas.

Flexible sleeve 206 can be of any suitable size, shape, construction and/or configuration. As one example, flexible sleeve 206 can include a flexible wall 230 that is at least partially formed from one or more layers or plies (not identified) of elastomeric material (e.g., natural rubber, synthetic rubber and/or thermoplastic elastomer) and can optionally include one or more plies or layers of filament reinforcing material (not shown), such as in the form of a strip, sheet and/or fabric layer, for example. Flexible wall 230 is shown extending in a longitudinal direction between opposing ends 232 and 234. In some cases, flexible wall 230 can, optionally, include a mounting bead disposed along either one or both of ends 232 and 234. In the arrangement shown in FIG. 4, mounting beads 236 and 238 are shown as being respectively disposed along ends 232 and 234. In some cases, the mounting beads can, optionally, include a reinforcing element, such as an endless, annular bead wire 240, for example.

It will be appreciated, that the ends of flexible sleeve 206 can be secured on, along or otherwise interconnected between end members 202 and 204 in any suitable manner. As one example, gas spring assembly 200 can include one or more bead retaining elements that engage at least a portion of the flexible sleeve and maintain the flexible sleeve in substantially fluid-tight engagement with the corresponding end member (e.g., end member 202). In the arrangement shown in FIG. 4, end 232 of flexible wall 230 is disposed in abutting engagement with surface 214 of plate wall 210. A bead retaining element in the form of an endless, annular bead ring 242 captures at least a portion of mounting bead 236 and is shown as being secured on or along plate wall 210 by way of a plurality of securement devices. In the arrangement shown, the plurality of securement devices includes threaded fasteners 244 that extend through mounting holes (not numbered) in bead ring 242 and corresponding mounting holes (not numbered) in plate wall 210. A lock washer (not numbered) and a threaded nut 246 are received along and operatively engage each of the threaded fasteners to secure bead ring 242 in abutting engagement along surface 214 of plate wall 210. It will be appreciated, however, that other retaining arrangements could alternately be used.

Figure 5:
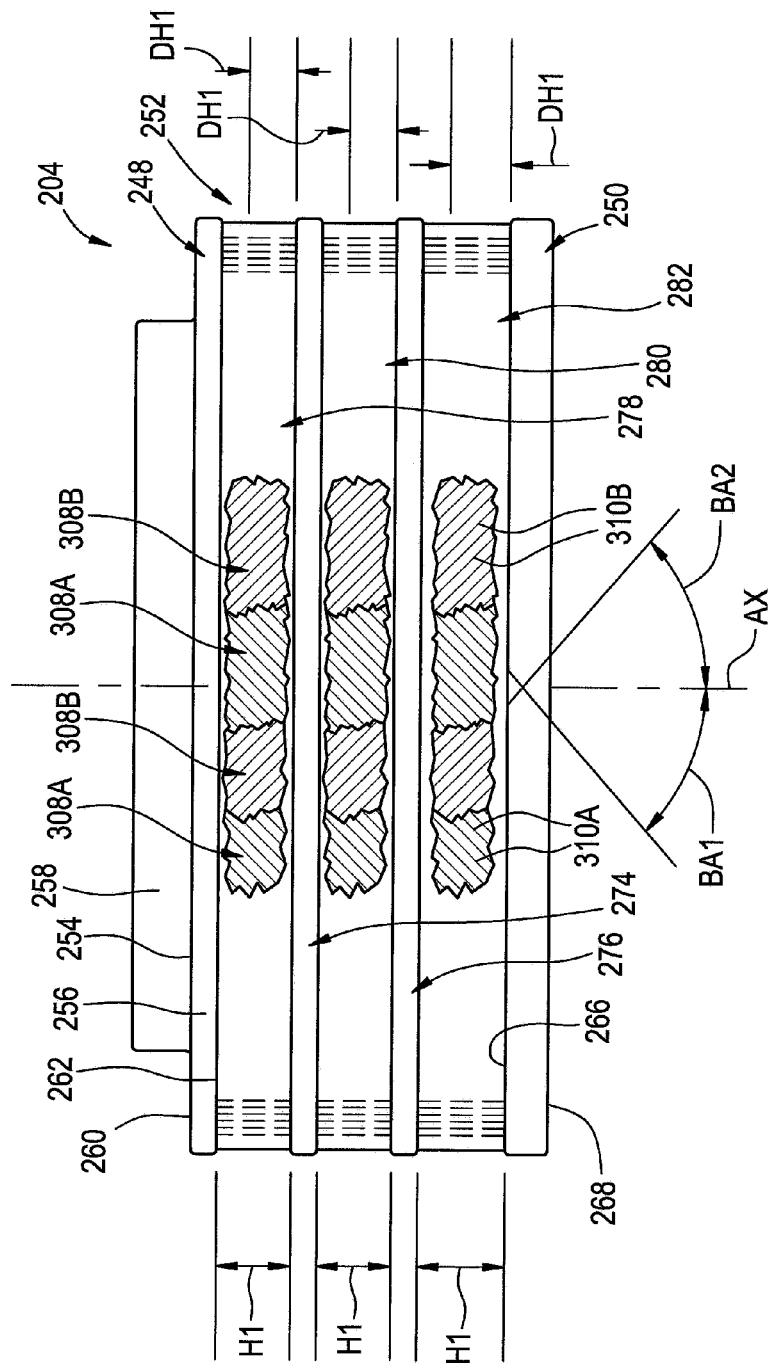
FIG. 5 is a side view, in partial cross section, of a portion of the end member shown in FIG. 4.

End member 204 is shown in FIGS. 4 and 5 as being one example of an end member in accordance with the subject matter of the present disclosure. End member 204 can include a mounting plate 248, a base plate 250 and a compliant support structure 252 that is operatively connected between plates 248 and 250. It will be appreciated that the mounting plate and the base plate can be of any suitable size, shape, configuration and/or construction. For example, mounting plate 248 can include an end wall portion 254 that is disposed transverse to axis AX and extends radially outward to an outer peripheral edge or surface 256. Mounting plate 248 can also include a mounting wall portion 258 that is disposed radially inward from outer peripheral surface 256 of end wall portion 254 and projects axially therefrom in a direction toward end member 202.

Mounting plate 248 also includes inner and outer sides 260 and 262 that include corresponding surface portions (not individually numbered) disposed along wall portions 254 and 258. The inner surface portions disposed along end wall portion 254 and mounting wall portion 258 can at least partially define a mounting seat (not identified) for receivingly-engaging mounting bead 238 of flexible wall 230. In the arrangement shown in FIG. 4, mounting bead 238 is compressively fitted along mounting wall portion 258 and into abutting engagement with end wall portion 254 such that a substantially fluid-tight seal is formed with at least one of the wall portions. It will be appreciated, however, that other configurations and/or arrangements could alternately be used.

Flexible wall 230 extends radially outward from mounting wall portion 258, along end wall portion 254 and beyond outer peripheral surface 256 such that a rolling lobe 264 is formed along the flexible wall. It will be appreciated that rolling lobe 264 is displaceable along the exterior of end member 204 in a conventional manner as the gas spring assembly is axially displaced between extended and compressed conditions, such as may occur during dynamic use in operation. Additionally, it will be appreciated that the exterior of the end member can have any suitable size, shape and/or configuration, such as may be useful to provide one or more desired performance characteristics, for example.

Base plate 250 can include opposing surfaces 266 and 268 with surface 266 disposed toward compliant support structure 252 and surface 268 disposed toward structural component SC2. Base plate 250 can also include one or more securement features suitable for operatively connecting the base plate to an associated structural component (e.g., structural component SC2). In the arrangement shown in FIG. 4, for example, the securement feature includes a threaded stud 270 that projects axially outwardly from along surface 268 in a direction opposite end member 202 and extends through a mounting hole MHL in structural component SC2. A threaded nut 272 is shown as engaging the threaded stud to secure end member 204 along the structural component. It will be appreciated, however, that other arrangements could alternately be used.

As indicated above, mounting plate 248 is supported on base plate 250 by compliant support structure 252, which can be of any suitable size, shape, configuration and/or construction. In a preferred arrangement, the compliant support structure can include at least one compliant element reinforced with one or more reinforcing layers or plies. In a more preferred arrangement, the compliant support structure can include at least one rigid element and at least one comparatively compliant element reinforced with one or reinforcing layers or plies with the at least one rigid element and the at least one comparatively compliant element stacked, sandwiched or otherwise disposed in serial relation to one another. Additionally, in a preferred arrangement, the at least one compliant element can be formed from an elastomeric material (e.g., natural rubber, synthetic rubber and/or thermoplastic elastomer) that is reinforced with one or more reinforcing layers or plies. In such a preferred arrangement, the at least one rigid element, if included, can be formed from a metal (e.g., steel and/or aluminum) or rigid thermoplastic (e.g., polyamide). Additionally, in a preferred arrangement, the one or more rigid elements, if included, and the one or more compliant elements can be permanently attached to one another (i.e., inseparable without damage, destruction or material alteration of at least one of the component parts).

It will be appreciated that any suitable quantity of rigid and compliant elements can be used, such as a quantity within a range of from zero to twenty rigid elements and a quantity within a range of from one to twenty-one compliant elements, for example. Additionally, it will be appreciated that the rigid and compliant elements are shown and described herein as having an at least approximately circular inner and outer shapes that result in approximately cylindrical inner and outer shapes of the end member. It will be recognized and understood, however, that such a configuration is merely exemplary and that any other shape and/or configuration could alternately be used, such as a non-circular inner or outer peripheral shape (e.g., oval, polygonal, irregular) of the rigid and/or compliant elements and/or a configuration of rigid and compliant elements that result in a non-cylindrical (e.g., frusto-conical) inner and/or outer shape of the end member.

In the exemplary arrangement shown in FIGS. 4 and 5, compliant support structure 252 includes a plurality of rigid elements, which include rigid elements 274 and 276, and a plurality of compliant elements, which include compliant elements 278, 280 and 282. Rigid element 274 is identified as having opposing surfaces 284 and 286, and rigid element 276 is identified as having opposing surfaces 288 and 290. In the configuration shown in FIGS. 4 and 5, rigid elements 274 and 276 are formed from thin-walled material and have a substantially planar cross-sectional profile. Additionally, the rigid elements include an outer peripheral surface or edge 292 and an inner surface or edge 294 that at least partially defines an opening (not numbered) through the rigid elements.

Compliant element 278 is attached to side surface portion 262 of mounting plate 248 and surface 284 of rigid element 274. Compliant element 280 is attached to surface 286 of rigid element 274 and surface 288 of rigid element 276. Compliant element 282 is attached to surface 290 of rigid element 276 and surface 266 of base plate 250. As discussed above, it will be appreciated that the compliant elements can be attached to the rigid elements as well as the mounting and base plates in any suitable manner. In a preferred arrangement, substantially fluid-tight joints or connections are formed between compliant element 278, mounting plate 248 and rigid element 274, between compliant element 280 and rigid elements 274 and 276, and between compliant element 282, rigid element 276 and base plate 250. In some cases, such substantially fluid-tight joints or connections can be formed by way of one or more processes and/or can include the use of one or more treatments and/or materials. Non-limiting examples of suitable processes can include molding, adhering, curing and/or vulcanizing.

Additionally, compliant elements 278, 280 and 282 are shown as including outer peripheral surfaces 296 and inner surfaces 298 that at least partially define an opening extending through the compliant elements. A chamber 300 can be formed within end member 204 that is substantially fluid-tight and can retain a quantity of pressurized gas at a desired pressure for an extended period of time, such as a period of hours, days, weeks or months, for example. In some cases, surface portion 302 of mounting plate 248 can at least partially define a passage 304 through which spring chamber 208 and chamber 300 can fluidically communication with one another. In some cases, passage 304 can be of sufficient size such that chambers 208 and 300 substantially function as a single volume of pressurized gas.

In general, compliant elements, such as compliant elements 278, 280 and 282, for example, will tend to flow or deflect in at least a radially-outward direction under axially-compressive load conditions. As such, one or more compliant element of an end member in accordance with the subject matter of the present disclosure can include a body that is at least partially formed from a quantity of elastomeric material and one or more reinforcing plies or layers that can be operative to restrict or otherwise limit radially-outward expansion of the body to thereby assist in controlling the overall axial deflection and spring rate of the compliant element. As one example, a compliant element can include a quantity of reinforcing plies within a range of from one (1) to fifty reinforcing plies.

In the arrangement shown in FIGS. 4 and 5, for example, compliant elements 278, 280 and 282 are shown as including a body 306 and a plurality of reinforcing plies 308 that are at least partially embedded within body 306 and extend peripherally about axis AX adjacent outer peripheral surface 296. In some cases, one or more of reinforcing plies 308 can form an endless, annular ring that extending axially through body 306.

As indicated above, the body can be formed from any suitable material or combination of materials capable of contributing to the desired performance characteristics of the compliant element. Examples of suitable materials can include rubber, such as natural and/or synthetic rubber, for example, and thermoplastic elastomers, such as polyurethane, for example. Additionally, it will be appreciated that the one or more reinforcing plies can be constructed from any suitable material or combination of materials capable of contributing to the desired performance characteristics of the compliant element and, preferably, include one or more reinforcing cords. The one or more reinforcing cords can be of any suitable type, kind and/or construction and can be formed from any suitable material or combination of materials, such as woven fabric or non-woven (e.g., weftless) cords. For example, the one or more reinforcing cords could take the form of monofilaments or twisted strands of fibers. Additionally, the one or more reinforcing cords could, for example, be formed from natural fibers (e.g., cotton yarn) or polymeric filaments (e.g., nylon or aramid cords).

It will be appreciated that the one or more reinforcing cords of the one or more reinforcing plies can be disposed in any suitable arrangement and/or configuration. For example, the reinforcing cords could be disposed at a non-zero bias angle with respect to longitudinal axis AX such that the reinforcing cords extend both longitudinally and peripherally along the reinforcing plies. As shown in FIGS. 4 and 5, for example, one or more first reinforcing plies 308A can include reinforcing cords 310A disposed at a first bias angle, which is identified by reference dimension BA1 in FIG. 5, and one or more second reinforcing plies 308B can include reinforcing cords 310B disposed at a second bias angle, which is identified by reference dimension BA2 in FIG. 5. It will be appreciated that any suitable bias angle or range of bias angles can be used for the reinforcing cords of the first and second, such as a bias angle within a range of from approximately 3 degrees to approximately 87 degrees, for example. Additionally, it will be appreciated that the reinforcing cords of the first reinforcing plies can be disposed at the same or a different bias angle with respect to the reinforcing cords of the second reinforcing plies. In one exemplary arrangement, such as is shown in FIG. 5, first and second bias angles BA1 and BA2 are at least approximately equal to one another but are oriented in opposing directions.

It will be appreciated that the performance of an end member in accordance with the subject matter of the present disclosure, such as end member 204, for example, will be a function, at least in part, of the performance characteristics of the rigid and compliant elements from which the end member is formed. That is, it will be recognized that the individual performance characteristics of the plurality of rigid and compliant elements of the end member will combine to at least partially establish the overall performance characteristics of the end member, such as overall axial deflection and spring rate, for example. Thus, it will be appreciated that rigid and compliant elements having any combination of performance characteristics can be used. In some cases, the rigid elements can be substantially identical to one another. In other cases, rigid elements having two or more different configurations and/or performance characteristics could be used. Additionally, or in the alternative, the compliant elements can, in in some cases, be substantially identical to one another. In other cases, compliant elements having two or more different configurations, constructions and/or performance characteristics could be used.

As such, it will be recognized and appreciated that different constructions, configurations and/or arrangements of rigid and compliant elements can be used to provide desired performance characteristics of the end member (e.g., end member 204) and corresponding gas spring assembly (e.g., gas spring assembly 200). In the arrangement shown in and described in connection with FIGS. 4 and 5, for example, rigid elements 274 and 276 are substantially identical to one another. Compliant elements 278, 280 and 282 have a height dimension H1 that is at least approximately equal to one another. Additionally, compliant elements 278, 280 and 282 are each shown as including a common quantity of reinforcing plies (e.g., plies 308A and 308B) with reinforcing cords (e.g., reinforcing cords 310A and 310B) disposed at approximately equal bias angles (e.g., bias angles BA1 and BA2). As such, compliant elements 278, 280 and 282 would be expected to exhibit approximately equivalent performance characteristics (e.g., spring rate and/or overall axial deflection), as is represented by a common deflected height dimension DH1.

Figure 6:
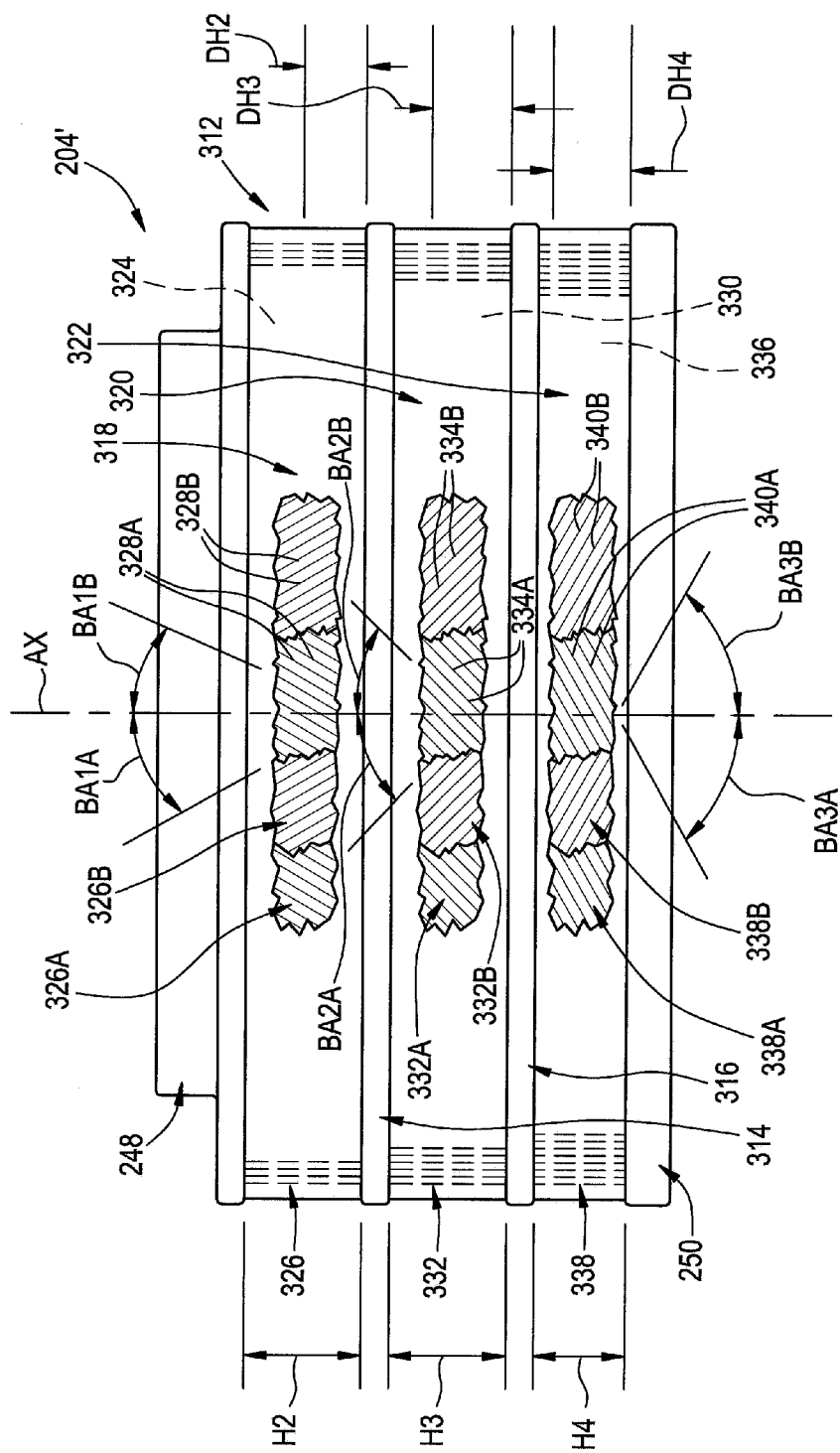
FIG. 6 is a side view, in partial cross section, of a portion of another example of an end member in accordance with the subject matter of the present disclosure.

Another example of an end member 204' in accordance with the subject matter of the present disclosure is shown in FIG. 6 and includes mounting plate 248, base plate 250 and an alternate construction of a compliant support structure, which is identified by item number 312 and can be secured between the mounting and base plates in any suitable manner, such as has been described above, for example. As discussed above, compliant support structure 252 includes rigid elements and compliant elements that, respectively, have a common size, shape and construction. In particular, this results in the compliant elements having common performance characteristics (e.g., spring rate and/or overall axial deflection).

Compliant support structure 312 differs from compliant support structure 252 in that structure 312 includes compliant elements that have different physical characteristics and constructions that result in the compliant elements having different performance characteristics. With further reference to FIG. 6, compliant support structure 312 includes a plurality of rigid elements, which include rigid elements 314 and 316, and a plurality of compliant elements, which include compliant elements 318, 320 and 322. It will be appreciated that rigid elements 314 and 316 can, in some cases, be substantially identical in size, shape and/or construction to rigid elements 274 and 276, the above description of which can be equally applicable to rigid elements 314 and 316.

The compliant elements can be formed form a body (e.g., body 306) of elastomeric material and one or more reinforcing plies or layers that can be operative to restrict or otherwise limit radial-outward expansion of the body to thereby assist in controlling the overall axial deflection and spring rate of the compliant element. In the arrangement shown in FIG. 6, compliant element 318 includes a body 324 and a first plurality of reinforcing plies 326. A portion 326A of the reinforcing plies include one or more reinforcing cords 328A disposed at a bias angle BA1A and a portion 326B of the reinforcing plies include one or more reinforcing cords 328B disposed at a bias angle BA1B relative to axis AX. As discussed above, bias angles BA1A and BA1B can be at least approximately equal to one another but can be oriented in opposing directions. Compliant element 320 includes a body 330 and a second plurality of reinforcing plies 332. A portion 332A of the reinforcing plies include one or more reinforcing cords 334A disposed at a bias angle BA2A and a portion 332B of the reinforcing plies include one or more reinforcing cords 334B disposed at a bias angle BA2B relative to axis AX. As discussed above, bias angles BA2A and BA2B can be at least approximately equal to one another but can be oriented in opposing directions. Additionally, compliant element 322 includes a body 336 and a third plurality of reinforcing plies 338. A portion 338A of the reinforcing plies include one or more reinforcing cords 340A disposed at a bias angle BA3A and a portion 338B of the reinforcing plies include one or more reinforcing cords 340B disposed at a bias angle BA3B relative to axis AX. As discussed above, bias angles BA3A and BA3B can be at least approximately equal to one another but can be oriented in opposing directions.

As discussed above, it will be recognized and appreciated that different constructions, configurations and/or arrangements of rigid and compliant elements can be used to provide desired performance characteristics of the end member (e.g., end member 204 and/or 204') and corresponding gas spring assembly (e.g., gas spring assembly 200). In the arrangement shown and described in connection with FIG. 6, for example, rigid elements 314 and 316 are substantially identical to one another. Compliant elements 318, 320 and 322 respectively include first, second and third pluralities of reinforcing plies 326, 332 and 338. In some cases, one or more of the pluralities of reinforcing plies can include a quantity of reinforcing plies that is different than another one or more of the pluralities of reinforcing plies. As one example, compliant elements 326, 332 and 338 are respectively shown in FIG. 6 as including four (4), six (6) and eight (8) reinforcing plies.

Additionally, or in the alternative, one or more of the pluralities of reinforcing plies can include reinforcing cords disposed at bias angles that are different from another one or more of the pluralities of reinforcing plies. As one example, compliant elements 326, 332 and 338 are respectively shown in FIG. 6 as being disposed at bias angles BA1A/BA1B, BA2A/BA2B and BA3A/BA3B. Further, or as a further alternative, one or more of the compliant elements can be of a different size, shape and/or other physical characteristic from another one or more of the compliant elements. As one example, compliant elements 326, 332 and 338 are respectively shown in FIG. 6 as having height dimensions H2, H3 and H4 with height dimensions H2 and H3 being approximately equal to one another but different from height dimension H4.

As a result of any combination of one or more of the foregoing differences in the construction, configuration and/or arrangement of the compliant elements, compliant elements 318, 320 and 322 would be expected to exhibit approximately different performance characteristics (e.g., spring rate and/or overall axial deflection), such as is represented in FIG. 6 by differing deflected height dimensions DH2, DH3 and DH4, respectively.

Figure 7:
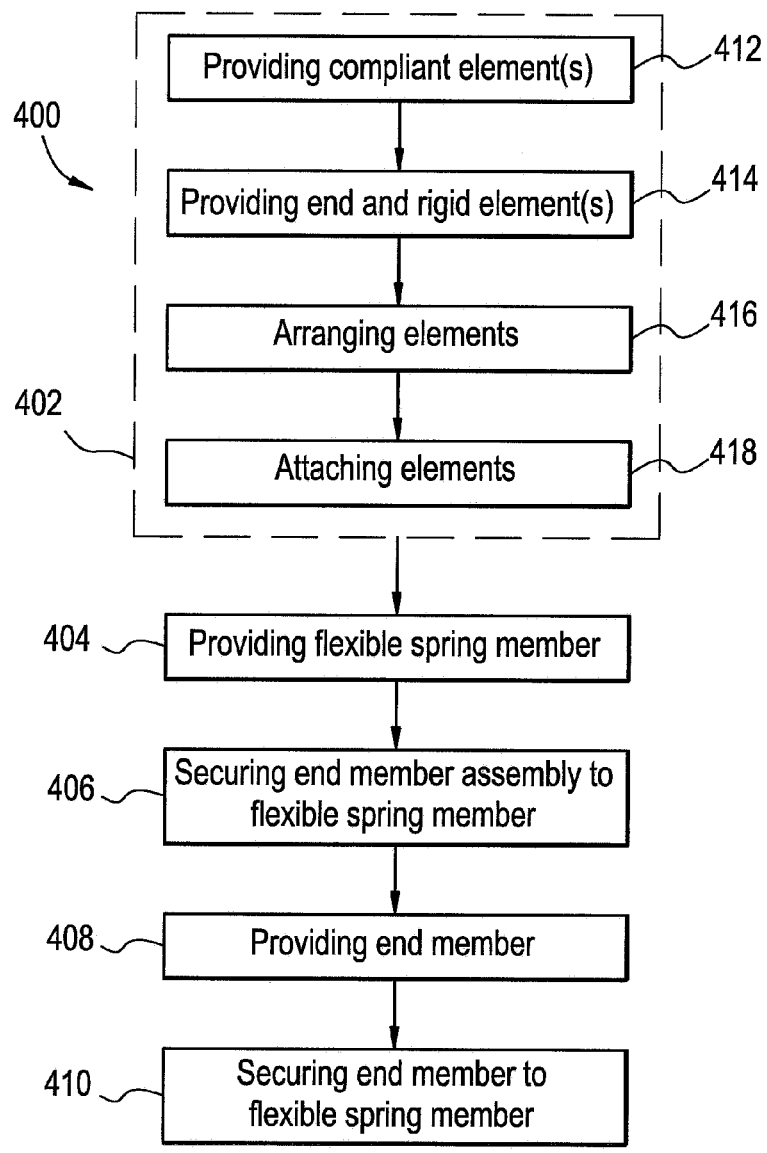
FIG. 7 is one example of a method of manufacturing a gas spring assembly including an end member assembly in accordance with the subject matter of the present disclosure.

With reference to FIG. 7, one example of a method 300 of manufacturing a gas spring assembly (e.g., gas spring assembly 120 and/or 200) in accordance with the subject matter of the present disclosure includes providing one or more end member assemblies (e.g., one or more of end member assemblies 204 and/or 204') that are at least partially formed from at least one compliant element reinforced with one or more reinforcing layers or plies, such as is represented by item number 302 in FIG. 7. In some cases, such a construction of an end member assembly may be operative to restrict or otherwise limit radially-outward expansion of the at least one compliant element to thereby assist in controlling the overall axial deflection and/or spring rate of the compliant element, end member assembly and corresponding gas spring assembly.

Method 400 can also include providing a flexible spring member (e.g. flexible spring member 206), as is represented by item number 404. Method 400 can further include securing an end member assembly (e.g., one of end member assemblies 204 and/or 204') across an end the flexible spring member to at least partially formed a spring chamber (e.g. spring chamber 208), as is represented by item number 406. The method can further include providing an end member (e.g., end member 202) and securing the end member along or across an end of the flexible spring member opposite the end member assembly, as are represented by item numbers 408 and 410 in FIG. 7, respectively.

It will be appreciated that the end member assembly (e.g., end member assembly 204 and/or 204') can be provided in item number 402 in any suitable manner. As one example, providing an end member in item number 402 can include providing at least one compliant element reinforced with one or more layers or plies of reinforcing material (e.g., fabric or weftless reinforcing cords), as is represented by item number 412. Providing an end member assembly in item number 402 can also, optionally, include providing one or more rigid elements (e.g., rigid elements 274, 276, 314 and/or 316) and/or one or more end elements (e.g., mounting plate 248 and/or base plate 250), as is represented in FIG. 7 by item number 414. Providing an end member assembly in item number 402 can further include arranging the one or more compliant elements, rigid elements and/or end elements in a stacked, sandwiched or otherwise serial position relative to one another and attaching the elements to one another, as are represented by item numbers 416 and 418 in FIG. 7, respectively.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. An end member assembly dimensioned for securement to an associated end of an associated flexible spring member of an associated gas spring assembly, said end member assembly comprising:
   a base plate including a base plate wall formed from a substantially rigid material and dimensioned for securement to an associated structural component;
   a mounting plate disposed in spaced relation to one another such that an end member axis extends longitudinally therebetween, said mounting plate including a mounting plate wall formed from a substantially rigid material and dimensioned for securement to an associated end of the associated spring member; and,
   a compliant support structure secured between said base plate and said mounting plate, said compliant support structure including a compliant element having a body at least partially formed from a compliant material and at least one reinforcing ply at least partially embedded within said body.

2. An end member assembly according to claim 1, wherein said compliant element of said compliant support structure is one of a plurality of compliant elements and at least one of said plurality of compliant elements includes said body at least partially formed from said compliant material and said at least one reinforcing ply at least partially embedded within said body.

3. An end member assembly according to claim 1, wherein said compliant element of said compliant support structure is one of at least two compliant elements and said compliant support structure includes at least one rigid element disposed between adjacent ones of said at least two compliant elements.

4. An end member assembly according to claim 3, wherein one of said compliant elements is attached to said base plate and another one of said compliant elements is attached to said mounting plate.

5. An end member assembly according to claim 3, wherein said at least two compliant elements have a substantially similar construction and exhibit substantially similar performance characteristics to one another.

6. An end member assembly according to claim 3, wherein one of said at least two compliant elements has a first construction and a first performance characteristic corresponding to said first construction, and another one of said at least two compliant elements has a second construction that differs from said first construction and a second performance characteristic corresponding to said second construction that differs from said first performance characteristic.

7. An end member assembly according to claim 6, wherein said first construction includes a first free height and said second construction includes a second free height that is different from said first free height.

8. An end member assembly according to claim 6, wherein said first construction includes a body at least partially formed from a first compliant material and said second construction includes a body at least partially formed from a second compliant material that is different from said first compliant material.

9. An end member assembly according to claim 6, wherein said first construction includes a plurality of reinforcing plies including reinforcing filaments disposed at a first bias angle relative to said end member axis, and said second construction includes a plurality of reinforcing plies including reinforcing filaments disposed at a second bias angle relative to said end member axis that is different from said first bias angle.

10. An end member assembly according to claim 6, wherein said first construction includes a first plurality of reinforcing plies, and said second construction includes a second plurality of reinforcing plies that is different from said first plurality of reinforcing plies.

11. An end member assembly according to claim 1, wherein said compliant element of said compliant support structure is one of at least three compliant elements and said compliant support structure includes at least two rigid elements disposed between adjacent ones of said at least three compliant elements with said at least two rigid elements disposed in spaced relation to one another with at least one compliant element disposed therebetween.

12. An end member assembly according to claim 1, wherein said compliant element body is at least partially formed from an elastomeric material including at least one of a natural rubber, a synthetic rubber and a thermoplastic elastomer.

13. An end member assembly according to claim 1, wherein said compliant element includes an outer side surface with said at least one reinforcing ply extending peripherally about said end member axis radially inward of said outer side surface.

14. An end member assembly according to claim 1, wherein said compliant element extends axially between an upper surface and a lower surface with said at least one reinforcing ply extending within said body between said upper and lower surfaces.

15. A gas spring assembly comprising:
   a flexible spring member having a longitudinal axis and extending between a first end and a second end opposite said first end, said flexible spring member extending peripherally about said longitudinal axis such that a spring chamber is at least partially defined by said flexible spring member between said first and second ends;
   an end member extending across said first end of said flexible spring member and secured to said flexible spring member such that a substantially fluid-tight seal is formed therewith; and,
   an end member assembly including:
      a base plate including a base plate wall formed from a substantially rigid material and dimensioned for securement to an associated structural component;
      a mounting plate including a mounting plate wall formed from a substantially rigid material and dimensioned for securement to an end of the associated flexible spring member; and,
      a compliant support structure secured between said base plate and said mounting plate, said compliant support structure including a compliant element having a body at least partially formed from a compliant material and at least one reinforcing ply at least partially embedded within said body, said at least one reinforcing ply operative to restrict radially-outward expansion of said at least one compliant element under compression of said gas spring assembly.

16. An end member assembly according to claim 15, wherein said compliant support structure is attached in a substantially fluid-tight manner between said base plate and said mounting plate.

17. An end member assembly according to claim 15, wherein said compliant support structure includes an end member chamber at least partially defined by said compliant element with said end member chamber disposed in fluid communication with said spring chamber.

18. An end member assembly according to claim 15, wherein said compliant support structure includes a plurality of compliant elements and at least one comparatively rigid element arranged in an alternating series such that one rigid element is disposed between adjacent compliant elements.

19. An end member assembly according to claim 18, wherein said plurality of compliant elements include from two to twenty-one compliant elements, and said at least one comparatively rigid element includes from one to twenty rigid elements.

20. A suspension system comprising:
   a pressurized gas system including a pressurized gas source and a control device; and,
   at least one gas spring assembly according to claim 15 disposed in fluid communication with said pressurized gas source through said control device such that pressurized gas can be selectively transferred into and out of said spring chamber.

21. A method of manufacturing a gas spring assembly, said method comprising:
   providing a flexible spring member having a longitudinal axis, said flexible spring member extending between a first end and a second end opposite said first end, and said flexible spring member extending peripherally about said longitudinal axis such that a spring chamber can be at least partially defined by said flexible spring member between said first and second ends;
   providing an end member and securing said end member across said first end of said flexible spring member such that a substantially fluid-tight seal is formed between said end member and said flexible spring member; and,
   providing an end member assembly including a base plate, a mounting plate and a compliant support structure, said base plate including a base plate wall formed from a substantially rigid material and dimensioned for securement to an associated structural component, said mounting plate including a mounting plate wall formed from a substantially rigid material and disposed in axially-spaced relation to said base plate with said compliant support structure secured between said base plate and said mounting plate, said compliant support structure including a compliant element having a body at least partially formed from a compliant material and at least one reinforcing ply at least partially embedded within said body, said at least one reinforcing ply operative to restrict radially-outward expansion of said at least one compliant element under compression of said gas spring assembly;
   securing said end member assembly across said second end of said flexible spring member such that a substantially fluid-tight seal is formed between said end member assembly and said flexible spring member.

22. A method according to claim 21, wherein providing an end member assembly includes providing a compliant support structure including a plurality of compliant elements and at least one comparatively rigid element, and arranging said plurality of compliant elements and said at least one comparatively rigid element in an alternating series such that one rigid element is disposed between adjacent compliant elements.

* * * * *